United States Patent
Mori et al.

(10) Patent No.: US 8,576,593 B2
(45) Date of Patent: Nov. 5, 2013

(54) AC-DC POWER CONVERTING APPARATUS HAVING SUB-CONVERTERS CONNECTED IN SERIES BETWEEN MAIN CONVERTER AND AC POWER SUPPLY

(75) Inventors: Osamu Mori, Tokyo (JP); Toshiyuki Fujii, Tokyo (JP); Akihiko Iwata, Tokyo (JP); Junichiro Ishikawa, Tokyo (JP); Masanori Yasue, Tokyo (JP); Yukimori Kishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 297 days.

(21) Appl. No.: 13/144,199

(22) PCT Filed: Dec. 1, 2009

(86) PCT No.: PCT/JP2009/006488
§ 371 (c)(1),
(2), (4) Date: Aug. 5, 2011

(87) PCT Pub. No.: WO2010/082265
PCT Pub. Date: Jul. 22, 2010

(65) Prior Publication Data
US 2011/0280049 A1 Nov. 17, 2011

(30) Foreign Application Priority Data
Jan. 13, 2009 (JP) ................... 2009-004261

(51) Int. Cl.
*H02M 7/08* (2006.01)
*H02M 7/00* (2006.01)
(52) U.S. Cl.
USPC ............................................. 363/67; 363/125
(58) Field of Classification Search
USPC ............................................. 363/67–69, 125
See application file for complete search history.

(56) References Cited

U.S. PATENT DOCUMENTS 6,671,191 B2 * 12/2003 Hanaoka et al. ............... 363/37
7,433,212 B2 * 10/2008 Igarashi et al. ................ 363/37
(Continued)

FOREIGN PATENT DOCUMENTS

| JP | 7 123722 | 5/1995 |
| JP | 10 210659 | 8/1998 |
| JP | 2006 109541 | 4/2006 |
| JP | 2007 174723 | 7/2007 |

(Continued)

OTHER PUBLICATIONS

International Search Report issued Feb. 9, 2010 in PCT/JP09/06488 filed Dec. 1, 2009.

*Primary Examiner* — Adolf Berhane
*Assistant Examiner* — Emily P Pham
(74) *Attorney, Agent, or Firm* — Oblon, Spivak, McClelland, Maier & Neustadt, L.L.P.

(57) ABSTRACT

A power converting apparatus is configured with single-phase sub-converters (4) connected to AC input lines of individual phases of a three-phase main converter (3) in series therewith. In a control device (12) for performing output control of the power converting apparatus, a current command value calculating circuit (20) which adjusts a DC voltage command given to the main converter (3) so that DC voltages of the sub-converters (4) follow a command and generates AC current commands so that a DC voltage of the main converter (3) follows the DC voltage command is configured with a CPU, and AC currents are controlled by switching output voltage levels of the sub-converters (4) at an AC side thereof so that deviations of instantaneous AC current values from the AC current commands become smaller.

9 Claims, 14 Drawing Sheets

(56) References Cited

U.S. PATENT DOCUMENTS 7,485,987 B2 2/2009 Mori et al.
8,223,517 B2 * 7/2012 Kishida et al. .................. 363/67
2009/0116268 A1 5/2009 Kishida et al.

FOREIGN PATENT DOCUMENTS

| JP | 2007 282442 | 10/2007 |
| JP | 2008 306805 | 12/2008 |
| WO | 2007 129456 | 11/2007 |

* cited by examiner

FIG. 6 SUB-CONVERTER OUTPUT CONTROL (R PHASE)

FIG. 7 SUB-CAPACITOR BALANCE CORRECTION CONTROL

FIG. 9
(a)
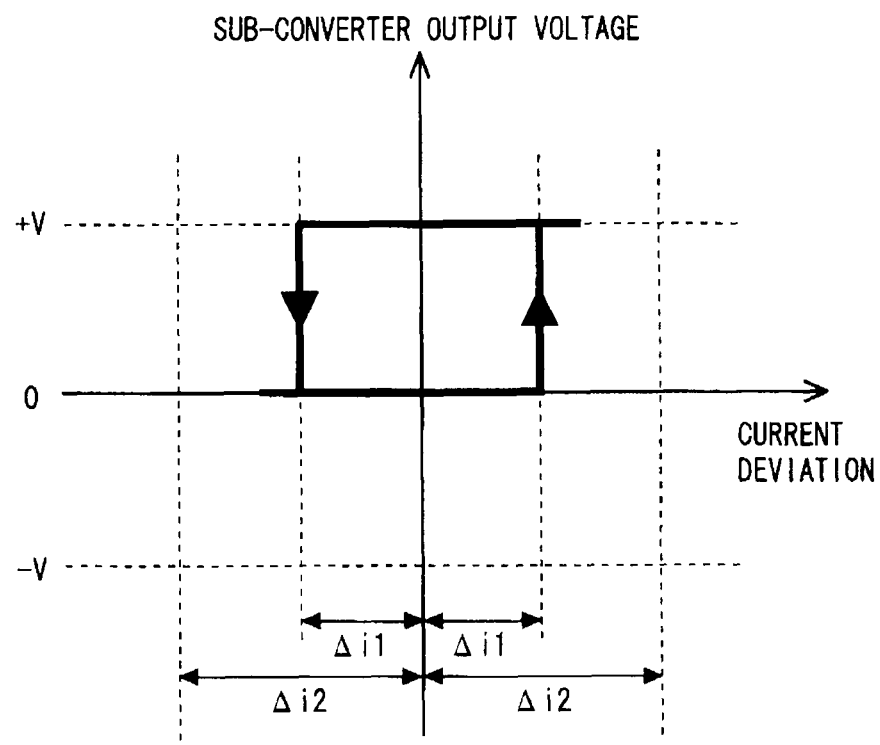
(b)
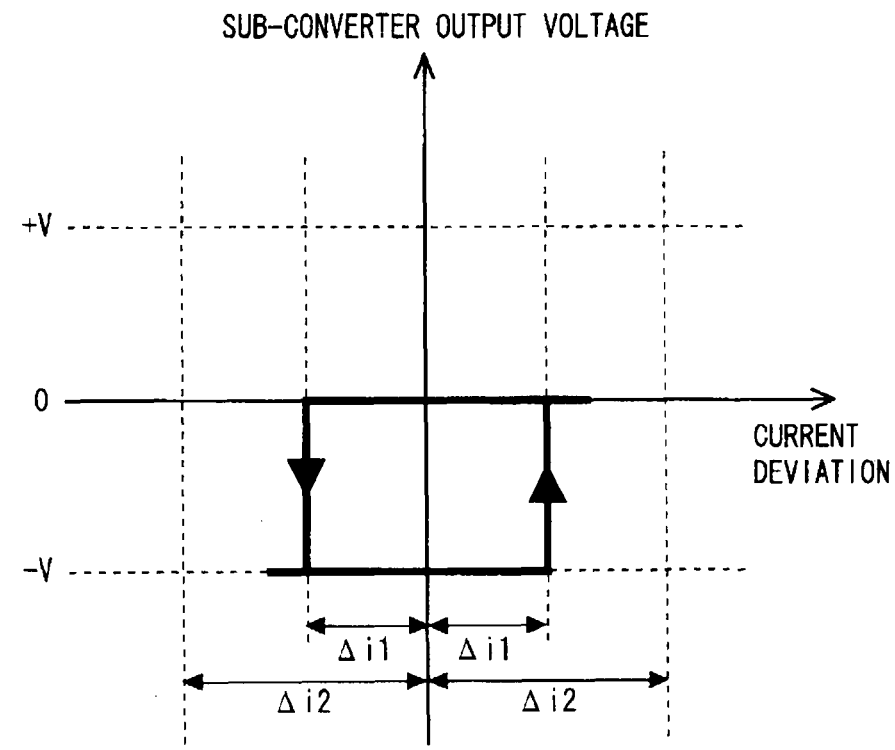

FIG. 10
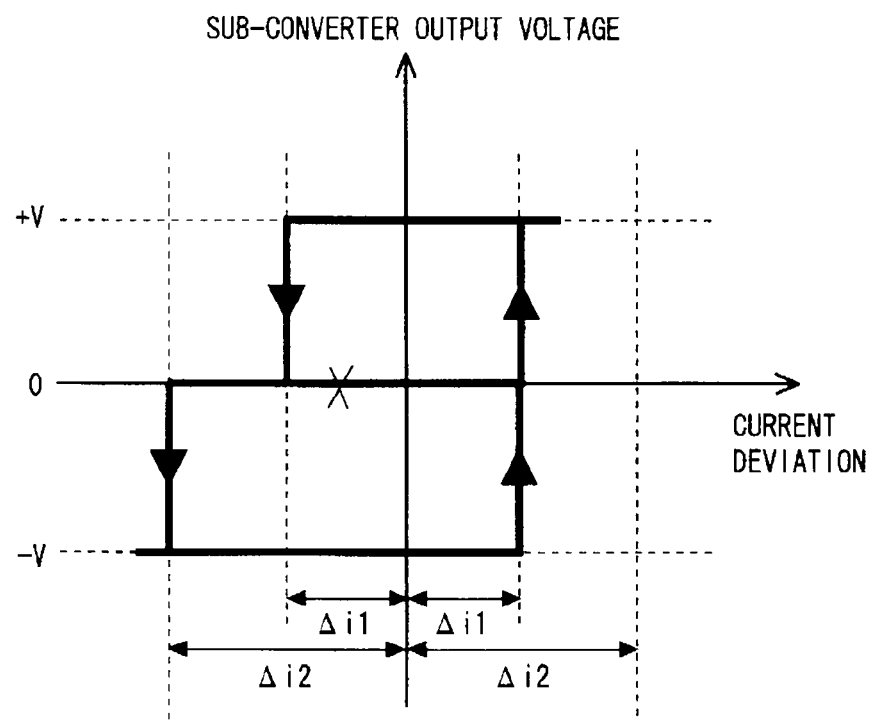
(a)
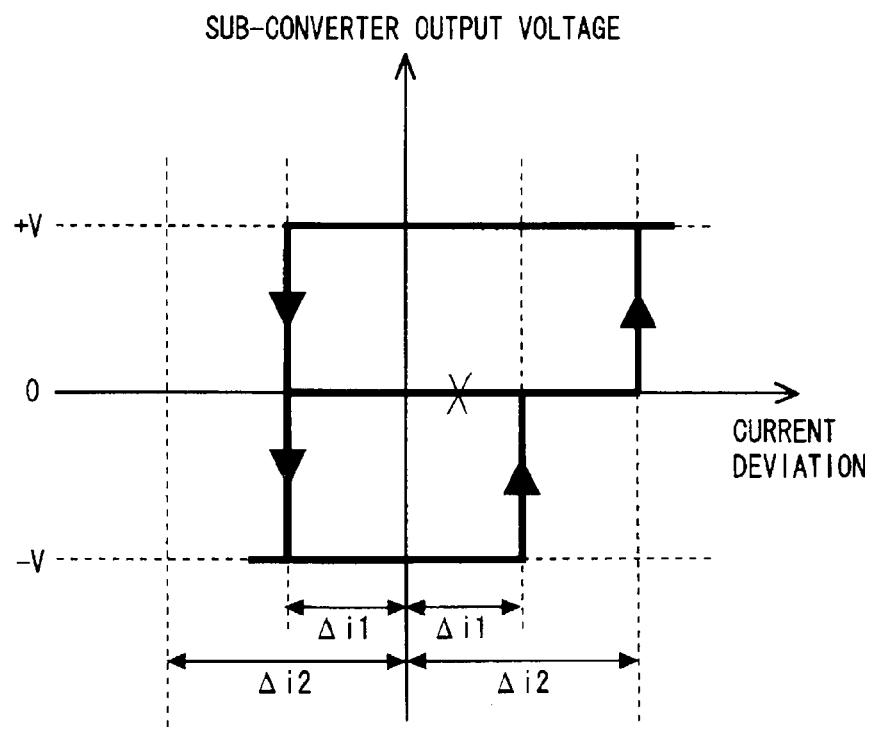
(b)

FIG. 11

| SW | A | B | C | D |
|---|---|---|---|---|
| XP | 1 | 0 | 1 | 0 |
| XN | 0 | 1 | 0 | 1 |
| YP | 0 | 1 | 1 | 0 |
| YN | 1 | 0 | 0 | 1 |
| SUB-OUTPUT | + | − | 0 | 0 |

RX → XP

RY → YP

AC-DC POWER CONVERTING APPARATUS HAVING SUB-CONVERTERS CONNECTED IN SERIES BETWEEN MAIN CONVERTER AND AC POWER SUPPLY

TECHNICAL FIELD

The present invention relates to control of a power converting apparatus having an AC/DC converting function.

BACKGROUND ART

Described below as an example of a conventional power converting apparatus is a converter capable of regeneration control operation.

A power converting apparatus is configured with AC sides of single-phase sub-converters having a DC voltage lower than a DC voltage of a three-phase main converter connected in series with AC input lines of individual phases of the main converter. The power converting apparatus is controlled by driving the main converter by gate pulses generated at a rate of one pulse per half cycle so that a voltage generated at an AC terminal of each sub-converter becomes equal to the difference between an AC power supply voltage and a voltage generated at each AC terminal of the main converter. This arrangement makes it possible to suppress harmonics without use of a reactor having a large capacity and reduce power loss and electromagnetic noise (refer to Patent Document 1, for example).

PRIOR ART DOCUMENT

Patent Document

Patent Document 1: International publication No. WO2007/129456

SUMMARY OF THE INVENTION

Problems to be Solved by the Invention

The conventional power converting apparatus is configured to generate an AC current command so as to maintain each of the DC voltages of the main converter and the sub-converters and to generate a voltage command so that AC currents follow the AC current command in order to control the sub-converters by pulse width modulation (PWM). A chronic problem has been that control hardware which enables this kind of control would require an expensive central processing unit (CPU) having an intricate configuration as well as complicated peripheral circuits such as a number of analog-to-digital (A/D) converters for handling information to be taken into the CPU. In addition, since response performance that allows the AC currents to follow the AC current command depends on the capability of the CPU, there has been a need for an even more expensive CPU for high-speed current control.

The present invention has been made to solve the aforementioned problem. Accordingly, it is an object of the invention to enable high-speed current control operation of a power converting apparatus including a main converter and sub-converters connected in series without the need for an expensive and intricate CPU.

Means for Solving the Problems

A power converting apparatus according to the present invention includes a power converter for performing power conversion between AC and DC including a main converter and sub-converters which deliver outputs to respective power storage devices provided individually at a DC side wherein a DC voltage of the main converter is higher than DC voltages of the sub-converters, the sub-converters being connected between the main converter and an AC power supply in series therewith, and a control device which controls the main converter by a first control signal generated based on a phase of the AC power supply, calculates a command for an AC current input into the power converter and controls the sub-converters by a second control signal generated in such a fashion that the instantaneous value of the AC current follows the AC current command. The aforementioned control device includes a current command calculator which adjusts a DC voltage command given to the main converter such that the DC voltages of the sub-converters follow a specific voltage command and generates the AC current command such that the DC voltage of the main converter follows the DC voltage command, a first control section which generates the first control signal to be delivered to the main converter, and a second control section which generates the second control signal for switching output voltage levels of the sub-converters at an AC side thereof such that a deviation of the instantaneous AC current value from the AC current command becomes smaller.

Advantageous Effects of the Invention

According to the present invention, the second control section generates the second control signal for switching the output voltage levels of the sub-converters at the AC side thereof such that the deviation of the instantaneous AC current value from the AC current command becomes smaller, so that it is possible to configure the second control section related to current control with a hardware logic circuit other than a CPU and accomplish high-speed control in causing the instantaneous AC current value to follow the AC current command. It is possible to achieve high-speed current control without the need for an expensive and intricate CPU as mentioned above.

BRIEF DESCRIPTION OF THE DRAWINGS

FIG. 9 is a diagram for explaining control of the sub-converters performed by the second control section according to the first embodiment of the present invention;

FIG. 10 is a diagram for explaining control of the sub-converters performed by the second control section according to the first embodiment of the present invention;

FIG. 11 is a diagram depicting a pattern of gate driving signals for the sub-converters according to the first embodiment of the present invention;

MODES OF CARRYING OUT THE INVENTION

First Embodiment

Figure 1:
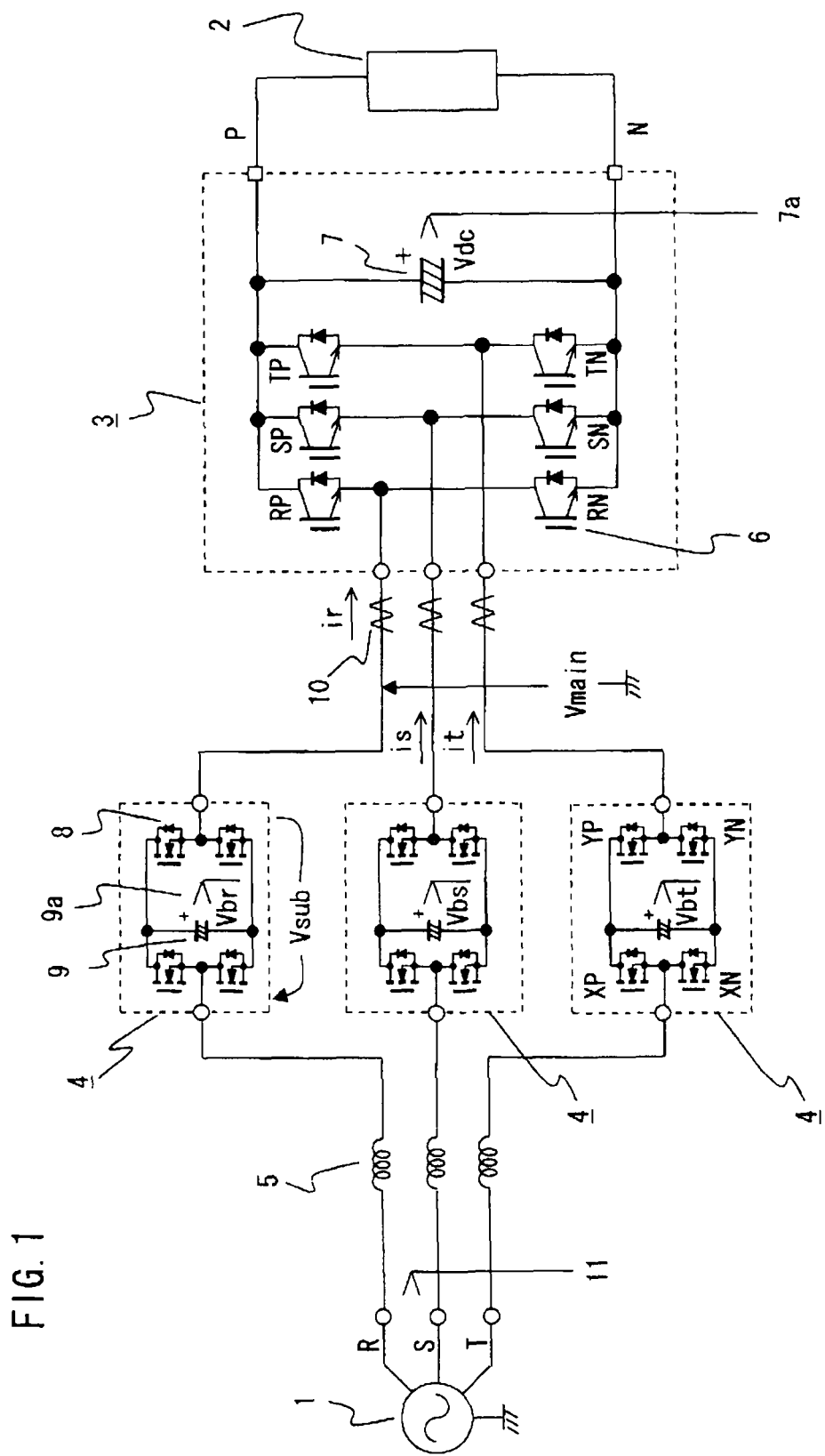
FIG. 1 is a configuration diagram of a main circuit (power converter) of a power converting apparatus according to a first embodiment of the present invention.

A power converting apparatus according to a first embodiment of the present invention is now described hereunder. FIG. 1 is a diagram illustrating the configuration of a power converter which is a main circuit of the power converting apparatus according to the first embodiment of this invention. More specifically, FIG. 1 is a diagram illustrating the configuration of the power converter which converts electric power fed from a three-phase AC power supply (system power supply) 1 into DC power and supplies the DC power to a DC load 2.

As illustrated in FIG. 1, sub-converters 4 made up of single-phase full-bridge circuits and AC reactors 5 are connected to AC lines of individual phases of a main converter 3 which converts three-phase AC power into DC power. The main converter 3 is a three-phase two-level converter with a main capacitor 7 connected at a DC side that serves as a power storage device, the main converter 3 employing self-turn-off type semiconductor switching devices 6, such as insulated-gate bipolar transistors (IGBTs) in which diodes are connected in reverse parallel, on the assumption that the main converter 3 regenerates and returns DC power to an AC side.

The semiconductor switching devices 6 used in this embodiment are not limited to the IGBTs but may be any devices like gate commutated turn-off thyristors (GCTs), gate turn-off thyristors (GTOs), transistors or metal oxide semiconductor field effect transistors (MOSFETs), or thyristors having no self-turn-off function but capable of forced commutating operation. Also, if an inverter circuit portion is associated with a braking resistor or the like for handling regenerated power when a motor or the like is connected to the DC load 2 through an unillustrated inverter circuit and it is not necessary to regenerate and return DC power to an AC network, the self-turn-off type semiconductor devices (semiconductor switching devices 6) may be replaced by diodes. Here, the individual semiconductor switching devices 6 of a positive (P) side and a negative (N) side that constitute arms of individual phases (R phase, S phase, T phase) of the main converter 3 are referred to as RP, RN, SP, SN, TP and TN, respectively.

The sub-converters 4 are each provided with a single-phase full-bridge circuit made up of a plurality of self-turn-off type semiconductor switching devices 8, such as MOSFETs, and a sub-capacitor 9 which serves as an independently working power storage device. The semiconductor switching devices 8 are not limited to the MOSFETs but may be any devices like IGBTs in which diodes are connected in reverse parallel, GCTs, GTOs or transistors, or thyristors having no self-turn-off function but capable of forced commutating operation in this case as well. Also, an arm at an AC power supply side of the sub-converter 4 of each phase and an arm at a load side thereof are referred to as an X-side arm and a Y-side arm, respectively, and the semiconductor switching devices 8 at the P side and the N side are referred to as XP, XN, YP, YN, respectively.

Each of the sub-converters 4 can output a DC voltage charged to an illustrated polarity for a desired period (output voltage: Vsub) across AC terminals. Specifically, provided that the DC voltage is V, each of the sub-converters 4 can apply three-level voltage values of Vsub={−V, 0, +V} across the AC terminals depending on combinations of ON and OFF states of the semiconductor switching devices 8.

The power converting apparatus is further provided with a voltage sensor 7a for detecting a voltage Vdc across the main capacitor 7 of the main converter 3, voltage sensors 9a for detecting voltages Vbr, Vbs, Vbt of the sub-capacitors 9 of the sub-converters 4 of the individual phases, current sensors 10 for detecting AC currents "i" (ir, is, it) input into the individual phases from the three-phase AC power supply 1 and a phase-locked loop (PLL) circuit 11 for detecting phases of the three-phase AC power supply 1. It is to be noted that a positive direction of each of the AC currents "i" corresponds to an arrow direction.

Provided that the three-phase AC power supply 1 is of a 200 V AC network, the voltage Vdc of the main capacitor 7 which is a DC output voltage is 250 V and the voltage of the sub-capacitors 9 of the individual phases is 60 V, for example, the power converter configured as described above can be built with the main converter 3 employing components having a 600 V withstand voltage and the sub-converters 4 employing components having a 100 V withstand voltage. Also, provided that the three-phase AC power supply 1 is of a 400 V AC network, the voltage Vdc of the main capacitor 7 which is the DC output voltage is 500 V and the voltage of the sub-capacitors 9 of the individual phases is 60 V, the power converter can be built with the main converter 3 employing components having a 1200 V withstand voltage and the sub-converters 4 employing components having the 100 V withstand voltage.

Also, the power converter capable of AC/DC converting operation may be of a type of which DC side has such an energy source as solar power or a fuel cell, the power converter being interconnected with an AC network to supply and receive electric power thereto and therefrom.

Figure 2:
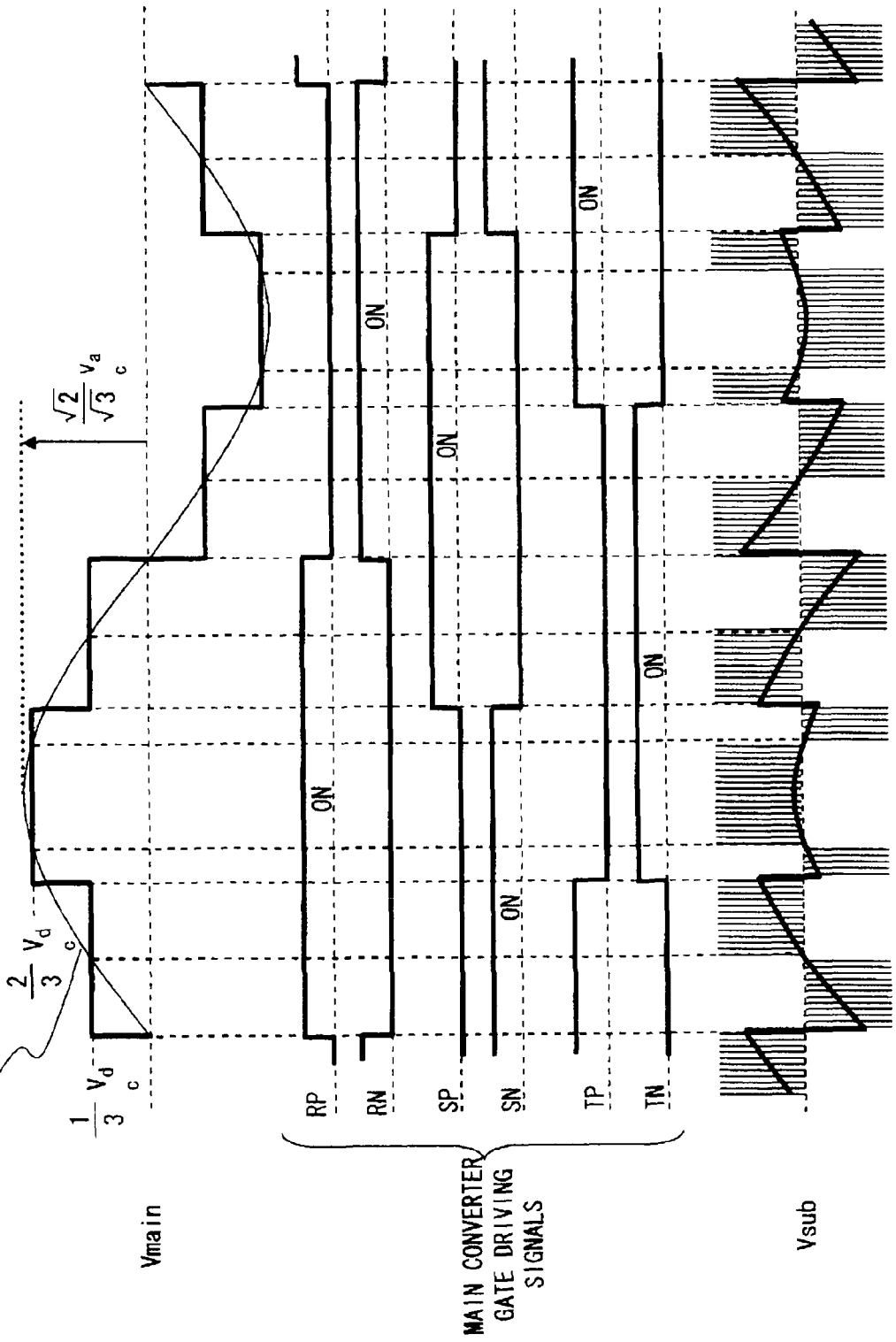
FIG. 2 is a diagram depicting waveforms at individual points for explaining the working of the power converter according to the first embodiment of the present invention.

Working of the power converter thus configured is now described hereunder. FIG. 2 is a diagram individually depicting waveforms of an output voltage Vmain of the R phase, for example, of the main converter 3, gate driving signals for the individual semiconductor switching devices 6 (RP, RN, SP, SN, TP, TN) constituting the main converter 3 and the output voltage Vsub of the R-phase sub-converter 4. Described hereinbelow are voltages for one phase only.

As depicted in the Figure, the gate driving signals for the individual semiconductor switching devices 6 of the main converter 3 are signals generated at a rate of one pulse per cycle (hereinafter referred to as the one-pulse signals) of a power supply phase voltage. When the power supply phase voltage of the R phase is of positive polarity, the semiconductor switching device RP on the P side is in an ON state and the semiconductor switching device RP on the N side is in an OFF state, and when the power supply phase voltage of the R phase is of negative polarity, the semiconductor switching device RP is in the OFF state and the semiconductor switching device RP is in the ON state.

Basic operation of the power converter is that the power converter performs power conversion between AC and DC in such a manner that the DC voltage Vdc of the main capacitor 7 of the main converter 3 that is the DC output voltage is maintained and, for this purpose, the power converter generates a sine-wave voltage which is the same voltage as a power supply voltage on the AC side.

The output voltage Vmain of the R phase of the main converter 3 as seen from an imaginary neutral point of the AC power supply 1 has a steplike waveform as illustrated. The semiconductor switching devices 8 of the sub-converter 4 of the R phase are turned on and off in fine steps so that the sub-converter 4 outputs a differential voltage (output voltage: Vsub) between the power supply phase voltage and the output voltage Vmain of the R phase of the main converter 3. While switching control operation of each sub-converter 4 will be described later in detail, each sub-converter 4 is controlled such that the AC current "i" flows in such a manner as to achieve a power factor equal to 1.

Figure 3:
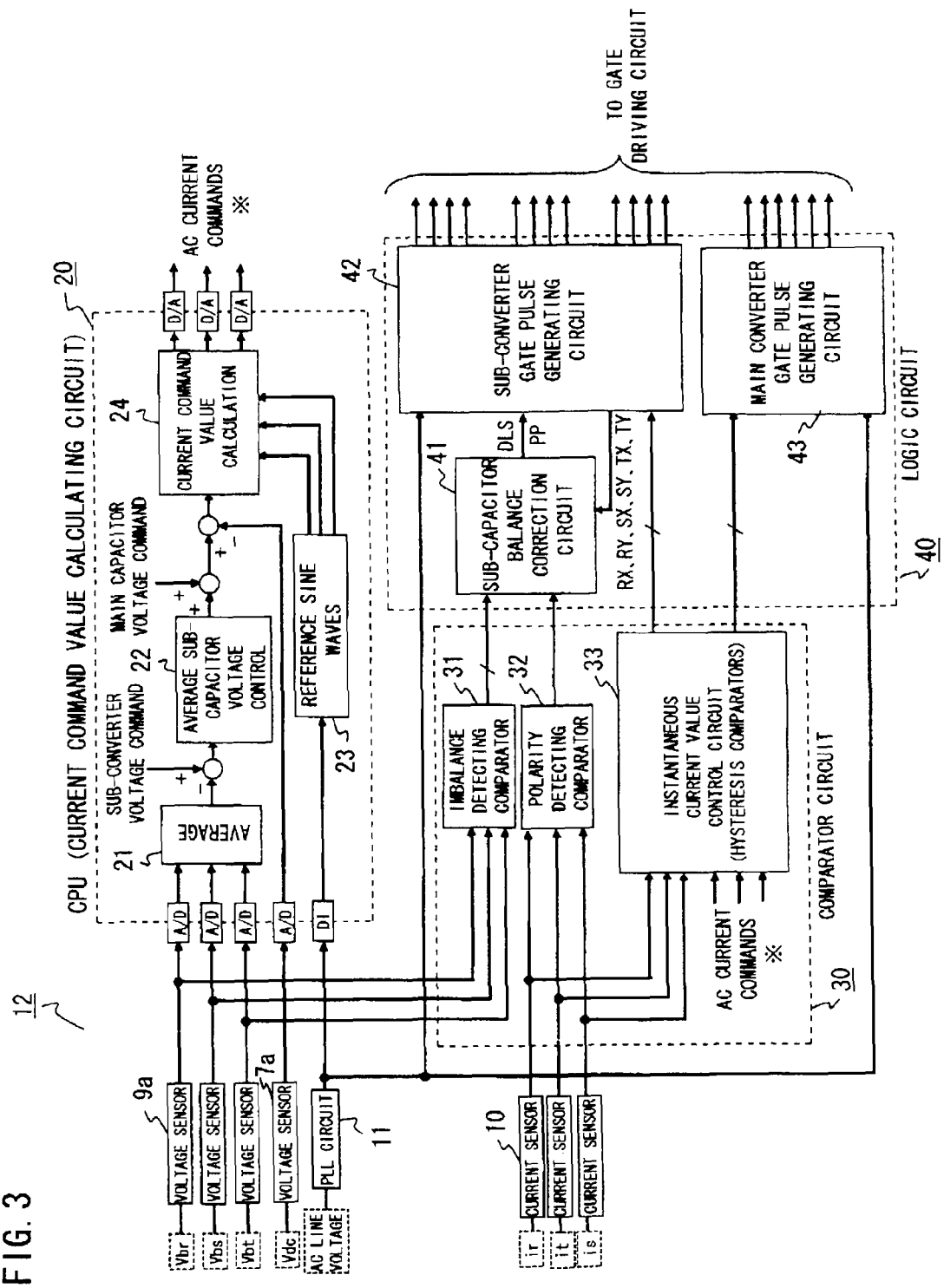
FIG. 3 is a diagram illustrating the hardware configuration of a control device according to the first embodiment of the present invention.

FIG. 3 is a diagram illustrating the hardware configuration of a control device 12 for controlling the above-described power converter. The control device 12 generates gate driving signals for the individual semiconductor switching devices 6, 8 of the main converter 3 and the sub-converters 4 of the individual phases and thereby controls the main converter 3 and the sub-converters 4 of the individual phases. Here, the gate driving signals for controlling the main converter 3 are first control signals and the gate driving signals for controlling the sub-converters 4 of the individual phases are second control signals.

As illustrated in FIG. 3, the control device is configured with hardware logic circuitry including a current command value calculating circuit 20 made up of a CPU which serves as a current command calculator for calculating AC current commands for the individual phases, a comparator circuit 30 and a logic circuit 40. Used for the logic circuit 40 is a field-programmable gate array (FPGA) or a programmable logic device (PLD), for example.

The comparator circuit 30 includes a comparator 31 (hereinafter referred to as the first comparator 31) for detecting an imbalance of the voltages Vbr, Vbs, Vbt of the sub-capacitors 9 of the individual phases obtained from the voltage sensors 9a, a comparator 32 (hereinafter referred to as the second comparator 32) for detecting polarities of the AC currents "ir", "is", "it" flowing in the individual phases obtained from the current sensors 10 and an instantaneous current value control circuit 33 made up of a plurality of hysteresis comparators. The instantaneous current value control circuit 33 outputs command signals corresponding to the main converter 3 and the sub-converters 4 of the individual phases so that the instantaneous values of the AC currents "ir", "is", "it" flowing in the individual phases follow the AC current commands for the individual phases generated by the current command value calculating circuit 20.

The logic circuit 40 includes a balance correction circuit 41 for correcting a voltage balance among the sub-capacitors 9 of the individual phases based on outputs of the first and second comparators 31, 32, a sub-converter gate pulse generating circuit 42 and a main converter gate pulse generating circuit 43.

Figure 4:
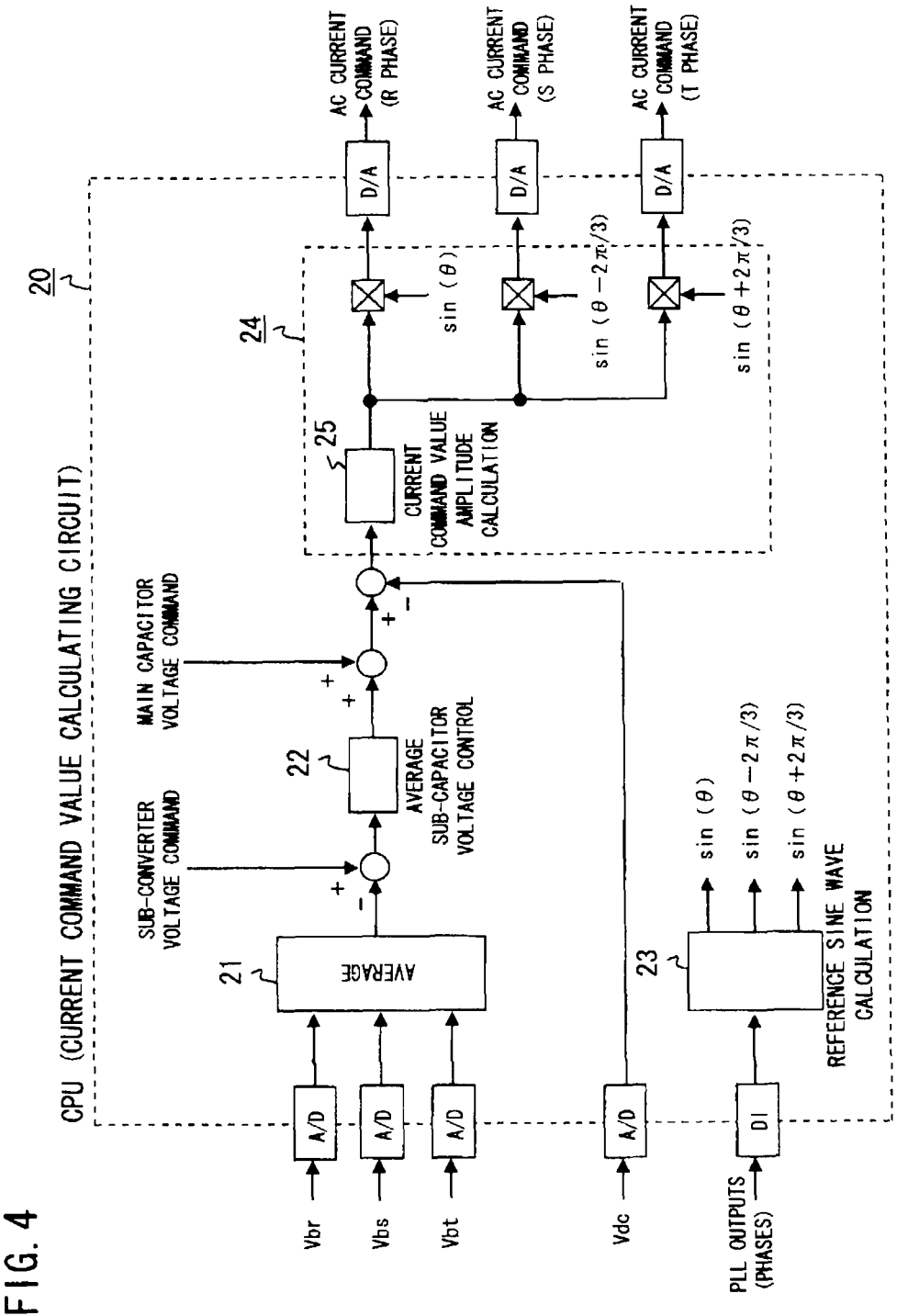
FIG. 4 is a diagram illustrating the configuration of a current command value calculating circuit (CPU) of the control device according to the first embodiment of the present invention.

Illustrated in FIG. 4 are details of control hardware of the current command value calculating circuit 20 which is made up of a CPU. It is possible to configure this current command value calculating circuit 20 by using a microcomputer or a digital signal processor (DSP), for example.

As depicted in the Figure, the current command value calculating circuit 20 receives the voltages Vbr, Vbs, Vbt of the sub-capacitors 9 of the individual phases obtained from the voltage sensors 9a as well as the voltage Vdc of the main capacitor 7 obtained from the voltage sensor 7a by way of A/D converters and further receives line voltage phases of the three-phase AC power supply 1 in the form of a digital signal derived from an output signal of an integrated circuit (IC) capable of phase detection like the PLL circuit 11, for example. Using the voltages Vbr, Vbs, Vbt of the individual phases as inputs, an average sub-capacitor voltage which is an average value of the three phases is calculated by a circuit 21. Then, a main capacitor voltage command is adjusted by adding an output of a circuit 22 controlled by a proportional-plus-integral (PI) control action performed thereby so that the average sub-capacitor voltage follows a sub-capacitor voltage command, or so that the difference therebetween becomes zero. Further, the difference between the main capacitor voltage Vdc and the main capacitor voltage command after adjustment is input into a current command generating circuit 24.

Additionally, reference sine waves of the individual phases are calculated by a circuit 23 based on the line voltage phases input from the PLL circuit 11 and these reference sine waves are input into the current command generating circuit 24. In the current command generating circuit 24, the difference between the main capacitor voltage Vdc and the main capacitor voltage command after adjustment is input into a circuit 25 and the circuit 25 calculates the amplitude of the AC current commands by performing a PI control action so that the main capacitor voltage Vdc follows the main capacitor voltage command after adjustment, or so that the difference therebetween becomes zero. Then, the current command generating circuit 24 calculates current command values used for generating the AC current commands for the individual phases by multiplying the amplitude of the AC current commands by the reference sine waves for the individual phases fed from the circuit 23.

The AC current commands calculated for the individual phases are output from the current command value calculating circuit 20 through digital-to-analog (D/A) converters.

As thus far described, the current command value calculating circuit 20 adjusts the main capacitor voltage command constituting a DC voltage command for the main converter 3 so that the average sub-capacitor voltage which is a DC voltage of the sub-converters 4 follows the sub-capacitor voltage command and generates the AC current commands so that the main capacitor voltage Vdc follows the main capacitor voltage command. In other words, the current command value calculating circuit 20 maintains the average sub-capacitor voltage and the main capacitor voltage Vdc at individually desired voltages by controlling the AC current commands. Also, as the current command value calculating circuit 20 adjusts the main capacitor voltage command for controlling the average sub-capacitor voltage, there is no need for providing any power supply components in DC sections of the sub-converters 4 and it is possible to achieve voltage stabilization by means of the sub-capacitors 9 alone.

Also, since the AC current commands for the individual phases are generated on the basis of the reference sine waves, the AC currents "ir", "is", "it" flowing in the individual phases are controlled to achieve a power factor equal to 1.

Next, a first control section which assumes output control of the main converter 3 and a second control section which assumes output control of the sub-converters 4 of the individual phases are described.

Figure 5:
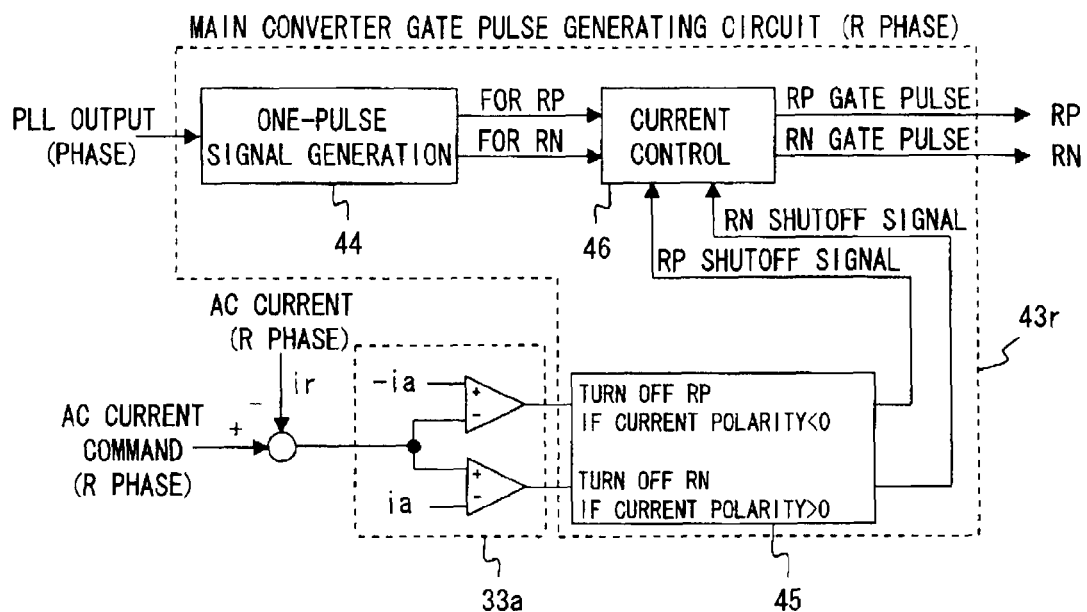
FIG. 5 is a diagram illustrating the configuration of a first control section which assumes output control of a main converter in the control device according to the first embodiment of the present invention.
Figure 6:
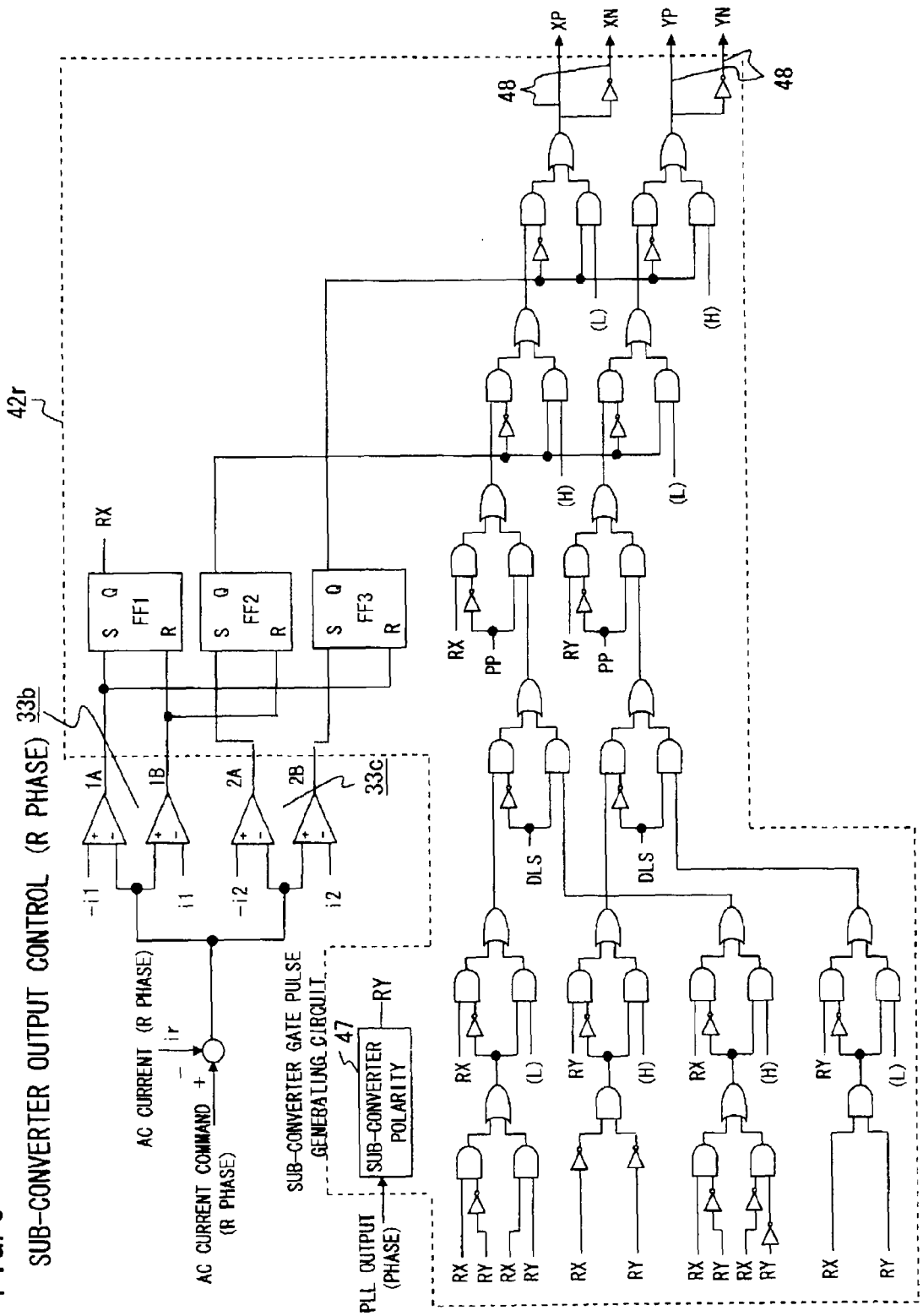
FIG. 6 is a diagram illustrating the configuration of a second control section which assumes output control of sub-converters in the control device according to the first embodiment of the present invention.
Figure 7:
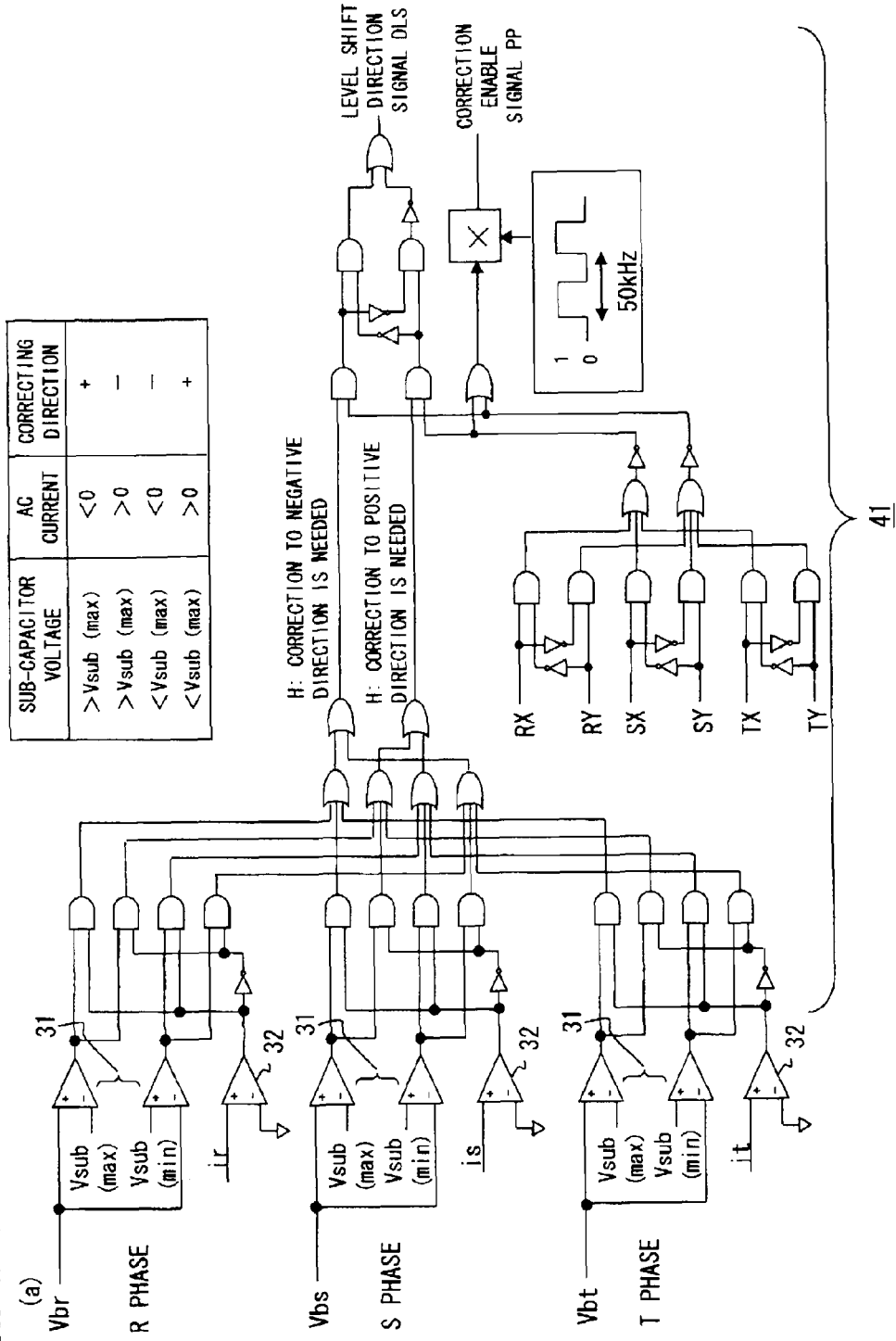
FIG. 7 is a diagram illustrating part of the configuration of the second control section which assumes output control of the sub-converters in the control device according to the first embodiment of the present invention.

The first control section and the second control section are two portions of the comparator circuit 30 and the logic circuit 40 that are divided according to functions which assume output control of the main converter 3 and output control of the sub-converters 4 of the individual phases. FIG. 5 illustrates details of the first control section while FIGS. 6 and 7 illustrate details of the second control section.

The instantaneous current value control circuit 33 provided in the comparator circuit 30 includes first to third hysteresis comparators 33a-33c, the first hysteresis comparator 33a constituting part of the first control section and the second and third hysteresis comparators 33b, 33c constituting part of the second control section. Incidentally, while the instantaneous current value control circuit 33 outputs the command signals upon comparing the AC current commands generated by the current command value calculating circuit 20 and the AC currents flowing in the individual phases, AC currents treated here are instantaneous AC current values. It is to be noted that what are mentioned simply as "AC currents" hereinafter refer to the instantaneous AC current values.

The first control section which assumes output control of the main converter 3 includes the first hysteresis comparator 33a and the main converter gate pulse generating circuit 43, and FIG. 5 depicts an R-phase portion of the first control section. It is to be pointed out that S-phase and T-phase portions also have a like configuration.

As illustrated in FIG. 5, an R-phase main converter gate pulse generating circuit 43r which includes a one-pulse signal generating circuit 44, a judgment circuit 45 and a current suppression circuit 46 generates gate driving signals (hereinafter referred to as the RP gate pulse and the RN gate pulse) for the semiconductor switching devices RP, RN of the R phase of the main converter 3.

The one-pulse signal generating circuit 44 produces the RP gate pulse and the RN gate pulse which are signals (one-pulse signals) generated at a rate of one pulse per cycle of the power supply phase voltage based on the line voltage phases input from the PLL circuit 11 (refer to FIG. 2).

While control operation applied to the R phase is explained hereunder, the other phases are also controlled in a similar fashion.

When a current deviation between the AC current "ir" and the AC current command generated by the current command value calculating circuit 20 exceeds a specified hysteresis width (±ia), the first hysteresis comparator 33a outputs an anomaly signal to the main converter gate pulse generating circuit 43r. The judgment circuit 45 provided in the main converter gate pulse generating circuit 43r uses the anomaly signal fed from the first hysteresis comparator 33a as an input. When the current polarity of the anomaly signal is negative, the judgment circuit 45 outputs an RP shutoff signal for turning off the semiconductor switching device RP, and when the current polarity of the anomaly signal is positive, the judgment circuit 45 outputs an RN shutoff signal for turning off the semiconductor switching device RN. The current suppression circuit 46, which receives outputs of the one-pulse signal generating circuit 44 and the judgment circuit 45, outputs the RP gate pulse and the RN gate pulse without making any changes thereto under normal conditions, whereas when the RP shutoff signal or the RN shutoff signal has been input from the judgment circuit 45, the current suppression circuit 46 outputs the RP gate pulse and the RN gate pulse upon making a correction to turn off the RP gate pulse or the RN gate pulse, respectively, during a pertinent period. The RP gate pulse and the RN gate pulse output from the current suppression circuit 46 are outputs of the main converter gate pulse generating circuit 43r which are used for driving and controlling the semiconductor switching devices RP, RN of the R phase.

The main converter 3 is controlled by the gate driving signals made up of the one-pulse signals under normal conditions and control operation for causing the AC current "ir" to follow the AC current command is performed by the output control of the sub-converters 4. While the output control of the sub-converters 4 will be described later in detail, currents can not be controlled by the output control of the sub-converters 4 and overcurrents may occur in a case where the power supply voltage sharply varies due to an instantaneous drop or a blackout, for instance. In a such case, the first hysteresis comparator 33a detects that the current deviation between the AC current "ir" and the AC current command has exceeded the hysteresis width (±ia), that is, an electric current anomaly, and the one-pulse signal for one of the semiconductor switching devices RP, RN of the main converter 3 is shut off.

Figure 8:
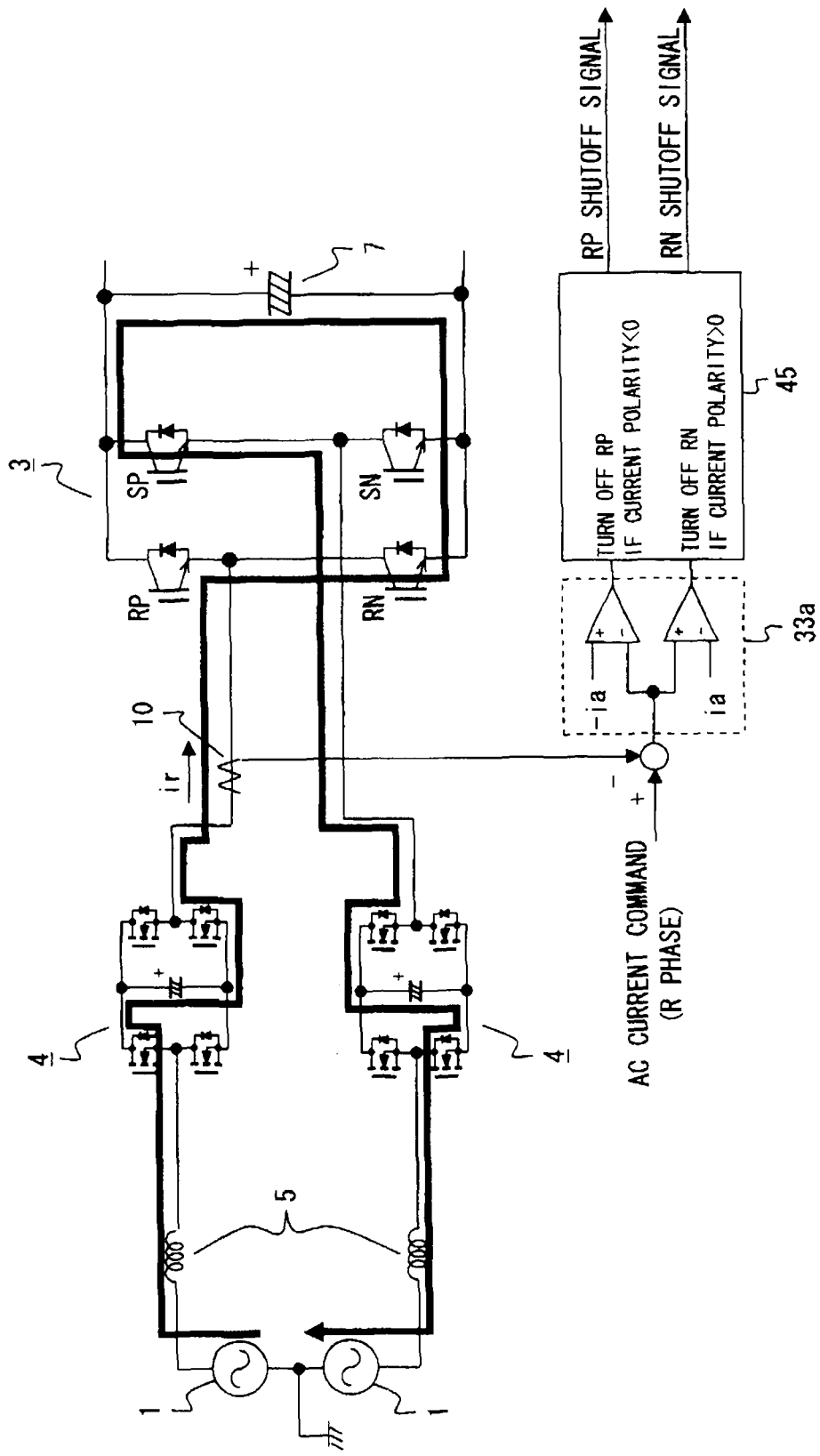
FIG. 8 is a diagram for explaining control of the main converter performed by the first control section according to the first embodiment of the present invention.

As depicted in FIG. 8, for example, when the AC current "ir" is positive, the semiconductor switching device RN is turned on and a current flows through an illustrated current path. If the first hysteresis comparator 33a detects an electric current anomaly at this time, the judgment circuit 45 outputs the RN shutoff signal and the RN gate pulse output from the main converter gate pulse generating circuit 43r is cut off. As a consequence, the semiconductor switching device RN is turned off to thereby suppress the AC current "ir". Then, when the difference between the AC current "ir" and the AC current command is reduced to fall within the specified hysteresis width (±ia) subsequently, the semiconductor switching device RN is turned on again to produce the RN gate pulse (one-pulse signal) as before. As discussed in the foregoing, it is possible to reduce the electric current prior to the occurrence of an overcurrent and continue operation even when the power supply voltage suddenly changes.

Next, as illustrated in FIG. 6, the second control section which assumes output control of the sub-converters 4 includes the second and third hysteresis comparators 33b, 33c and a sub-converter gate pulse generating circuit 42r. As illustrated in FIG. 7, the second control section also includes the first comparator 31 for detecting an imbalance of the voltages Vbr, Vbs, Vbt of the sub-capacitors 9 of the individual phases, the second comparator 32 for detecting polarities of the AC currents "ir", "is", "it" flowing in the individual phases and the balance correction circuit 41 for correcting the voltage balance among the sub-capacitors 9 of the individual phases based on the outputs of the first and second comparators 31, 32.

While FIG. 7 illustrates all of three-phase portions, the configuration depicted in FIG. 6 presents only the R-phase portion for the sake of simplification as the S-phase and T-phase portions also have a like configuration. Although an explanation given below referring to FIG. 6 covers control operation for the R-phase portion, the other phase portions are also controlled in a like fashion.

As illustrated in FIG. 6, the current deviation between the AC current command generated by the current command value calculating circuit 20 and the AC current "ir" is input into the second and third hysteresis comparators 33b, 33c.

A hysteresis width (±i2) for the third hysteresis comparator 33c is wider than a hysteresis width (±i1) for the second hysteresis comparator 33b and narrower than the hysteresis width (±ia) for the first hysteresis comparator 33a of the first control section. This means that if the absolute values of these hysteresis widths are compared, there is a relationship expressed by i1<i2<ia. The second and third hysteresis comparators 33b, 33c each output an anomaly signal when the input current deviation exceeds the relevant hysteresis width and the output of each of the second and third hysteresis comparators 33b, 33c is input into the sub-converter gate pulse generating circuit 42r.

The basic configuration for output control of the sub-converters 4 is now described below.

Since the sub-converters 4 each have a full-bridge structure, each of the sub-converters 4 selectively outputs one of three levels {−V, 0, +V} to the AC side provided that the DC voltage is V. FIGS. 9(a) and 9(b) are diagrams for explaining switching of the output voltage level, FIGS. 9(a) and 9(b) each representing the current deviation between the AC current command and the AC current "ir" by a horizontal axis and the output voltage level of the sub-converters 4 by a vertical axis. In this case, the output voltage level is switched in a manner that the AC current "ir" is suppressed by using the second hysteresis comparator 33b when the current deviation exceeds the hysteresis width (±i1).

There are two kinds of modes for the switching of the output voltage levels, the two modes being switching between {−V} and {0} as depicted in FIG. 9(a) and switching between {0} and {+V} as depicted in FIG. 9(b). One of these modes is selected according to output polarity of the sub-converter 4 determined on the basis of the line voltage phase input from the PLL circuit 11 to the sub-converter gate pulse generating circuit 42r. Then, the output voltage level is switched as a result of changing of a switching pattern of sub-converter gate pulses 48 which are gate driving signals supplied to the semiconductor switching devices XP, XN, YP, YN.

The output voltage level is switched as described above so that the AC current "ir" follows the AC current command. If, however, there is fluctuation in the phase of the power supply voltage or a delay in a phase detecting system, for instance, there occurs a possibility that the output polarity of the sub-converter 4 may be disturbed, causing the AC current "ir" to fall out of a desirable range. A correction to be made when the current deviation exceeds the hysteresis width (±i1) for the second hysteresis comparator 33b and does not return to normal even if the output voltage level is switched is described hereunder with reference to FIGS. 10(a) and 10(b).

FIGS. 10(a) and 10(b) are diagrams for explaining switching of the output voltage level, FIGS. 10(a) and 10(b) each representing the current deviation between the AC current command and the AC current "ir" by a horizontal axis and the output voltage level of the sub-converters 4 by a vertical axis. In this case, the output voltage level is switched in a manner that the AC current "ir" is suppressed by using the second hysteresis comparator 33b when the current deviation exceeds the hysteresis width (±i1) and, then, the output voltage level is further switched in a manner that the AC current "ir" is suppressed by using the third hysteresis comparator 33c when the current deviation exceeds the hysteresis width (±i2).

Even if the output voltage level is switched from {+V} to {0} when the current deviation increases in a negative direction and exceeds •i1 as depicted in FIG. 10(a), the current deviation (absolute value) does not decrease. When the current deviation continues to increase and exceeds •i2, the output voltage level is further switched from {0} to {−V} so as to forcibly alter the current polarity and thereby decrease the current deviation (absolute value). Also, even if the output voltage level is switched from {−V} to {0} when the current deviation increases in a positive direction and exceeds •i1 as depicted in FIG. 10(b), the current deviation does not decrease. When the current deviation continues to increase and exceeds •i2, the output voltage level is further switched from {0} to {+V} so as to forcibly alter the current polarity and thereby decrease the current deviation (absolute value).

As discussed in the foregoing, output control of the sub-converters 4 is a control operation for switching the output voltage level at the AC side of each sub-converter 4 in such a manner that the current deviation between the AC current command and the AC current "ir" would decrease. The sub-converter gate pulses 48 for carrying out such switching of the output voltage level are generated by the sub-converter gate pulse generating circuit 42r.

As depicted in FIG. 6, the sub-converter gate pulse generating circuit 42r receives outputs of the second and third hysteresis comparators 33b, 33c that are input into flip-flop circuits FF1, FF2, FF3 to produce outputs in the form of pulse signals. The flip-flop circuit FF1 outputs a basic control signal RX (hereinafter referred to as the current control signal RX) for output current control and the current control signal RX serves as a driving signal source for the X-side arm of the sub-converter 4.

Also, the line voltage phase fed from the PLL circuit 11 is input into the sub-converter gate pulse generating circuit 42r in which a circuit 47 determines the output polarity of the sub-converter 4 and generates a polarity control signal RY for switching the output polarity. The polarity control signal RY for the sub-converter 4 is used as a driving signal source for the Y-side arm of the sub-converter 4. Incidentally, the output polarity of the sub-converter 4 is determined from phase on the assumption of the output voltage Vsub of the sub-capacitor depicted in FIG. 2.

The sub-converter gate pulses 48 which are the gate driving signals supplied to the semiconductor switching devices XP, XN, YP, YN can be determined from the aforementioned current control signal RX and polarity control signal RY from among four kinds of switching patterns A through D as depicted in FIG. 11. Prior to this determination of the sub-converter gate pulses 48, the current control signal RX and the polarity control signal RY are varied by using a specific logic based on a level shift direction signal DLS serving as a shift correction signal obtained by a later-described balance control operation performed on sub-capacitor voltages of the individual phases and a correction enable signal PP. Then, current control signals based on the outputs of the second and third hysteresis comparators 33b, 33c are output from the flip-flop circuits FF2, FF3 and, according to these outputs, the sub-converter gate pulses 48 are modified and so output in such a manner as to forcibly alter the current polarity by further switching the output voltage level of the sub-converter 4.

As described above, the control operation for switching the output voltage level at the AC side of each sub-converter 4 is performed in a manner that the current deviation between the AC current command and the AC current "ir" becomes smaller. While this current control operation is performed for the individual phases, the AC current command used therefor is a value calculated by the current command value calculating circuit 20 by using the average sub-capacitor voltage which is an average value of the voltages Vbr, Vbs, Vbt of the individual phases. For this reason, the second control section which assumes output control of the sub-converters 4 having a circuit configuration illustrated in FIG. 7 corrects the voltage balance among the sub-capacitors 9 of the individual phases in order to enhance reliability of the control operation. Then, the level shift direction signal DLS and the correction enable signal PP so generated are input into the sub-converter gate pulse generating circuit 42 (42r) of each phase and the sub-converter gate pulses 48 are output so that voltages of the sub-capacitors 9 of the individual phases are balanced.

As depicted in FIG. 7, the first comparator 31 detects an imbalance of the voltages Vbr, Vbs, Vbt of the sub-capacitors 9 of the individual phases obtained from the voltage sensors 9a and the second comparator 32 detects polarities of the AC currents "ir", "is", "it" flowing in the individual phases obtained from the current sensors 10. Then, based on the outputs of the first and second comparators 31, 32 and the current control signals RX, SX, TX and the polarity control signals RY, SY, TY generated in the sub-converter gate pulse generating circuits 42 (42r) of the individual phases, the balance correction circuit 41 generates the level shift direction signal DLS and the correction enable signal PP. What is performed within the balance correction circuit 41 is to first determine whether or not it is necessary to shift the output voltage level of the sub-converter 4 of any phase in the positive or negative direction based on the outputs of the first and second comparators 31, 32 and then generate the level shift direction signal DLS and the correction enable signal PP that match the control operation to be actually performed based on the current control signals RX, SX, TX and the polarity control signals RY, SY, TY for the individual phases.

Specifically, when the voltage of the sub-capacitor 9 of any one of the three phases exceeds an upper threshold value and AC current polarity is negative or the voltage of the sub-capacitor 9 of any one phase is equal to or lower than a lower threshold value and the AC current polarity is positive, that is, when a condition that a current flows in a direction from the AC power supply 1 to the load 2 is satisfied, the balance correction circuit 41 judges that it is necessary to correct the output voltage levels of the sub-converters 4 of the individual phases to simultaneously shift to the positive direction for the individual phases. If, however, when any of the phases outputs {+V}, the balance correction circuit 41 outputs the level shift direction signal DLS upon correcting the same so that no shift operation will be performed. Also, when the voltage of the sub-capacitor 9 of any one phase exceeds the upper threshold value and the AC current polarity is positive or the voltage of the sub-capacitor 9 of any one phase is equal to or lower than the lower threshold value and the AC current polarity is negative, the balance correction circuit 41 judges that it is necessary to correct the output voltage levels of the sub-converters 4 of the individual phases to simultaneously shift to the negative direction for the individual phases. If, however, when any of the phases outputs {−V}, the balance correction circuit 41 outputs the level shift direction signal DLS upon correcting the same so that no shift operation will be performed.

Then, while the balance correction circuit 41 performs control operation for maintaining the balance of the voltages of the sub-capacitors 9 which are DC voltages of the sub-converters 4 by using the level shift direction signal DLS, the balance correction circuit 41 generates the correction enable signal PP for limiting level shift operation at specified time intervals. This is because the voltage balance control operation performed on the sub-capacitors 9 has a greater effect than the aforementioned current control operation for causing the AC currents to follow the AC current commands and it is intended to avoid the risk of divergence potentially caused by the current control operation. This approach serves to enable appropriate control through regulation of the amount of balance control. Here, timings of enabling and inhibiting level shift operation and the ratio therebetween can be freely set.

It will be understood from the above that when the balance of the voltages of the sub-capacitors 9 is disrupted, it is possible to keep the voltage balance among the sub-capacitors 9 stable by simultaneously shifting the output voltage levels {−V, 0, +V} of the sub-converters 4 of all the three phases to thereby control an energy balance among the individual phases. The balance correction circuit 41 performs the current control operation for causing the AC currents to follow the AC current commands while controlling the balance of the voltages of the sub-capacitors 9 in the above-described manner.

While the power converting apparatus carries out a so-called high power factor converter operation including an input power factor control operation performed when converting AC power into constant DC power in the present embodiment, it is needed to perform only the switching control operation for switching the output voltage levels of the sub-converters 4 at the AC side thereof to increase and decrease the AC currents so that the instantaneous values of the AC currents follow the respective AC current commands. Accordingly, the main converter 3 is required to perform only a switching operation at a rate of one pulse per cycle in synchronism with the phase the AC power supply 1. Since the main converter 3 performs the switching operation at a low frequency and the sub-converters 4 whose voltage levels are low perform instantaneous value control of the AC currents by way of switching operation at a high frequency to suppress the AC currents as described above, it is possible to accomplish a high-speed current control operation regardless of the capability of the CPU. Also, since the instantaneous value control of the AC currents performed by the sub-converters 4 makes use of the hysteresis comparators 33b, 33c of a two-stage structure which employs two kinds of hysteresis widths, it is possible to continue the current control operation, providing improved reliability of the control operation in a stable fashion, even on the occurrence of a disturbance to the power supply voltage.

Then, when it becomes impossible to perform the current control operation by output control of the sub-converters 4 and, further, the current deviation increases exceeding (±ia), the one-pulse signals of the main converter 3 are cut off to suppress overcurrents. Therefore, it is possible to continue operation of the power converting apparatus, without causing the power converting apparatus to become uncontrollable even in a case where the power supply voltage sharply varies due to an instantaneous drop or a blackout, for instance.

Also, as the switching control operation for switching the output voltage levels of the sub-converters 4 at the AC side thereof is performed upon making a correction for shifting the output voltage levels so that the voltages of the sub-capacitors 9 of the three phases are balanced, the sub-capacitor voltages of the individual phases are balanced and maintained at a specific voltage.

Also, an arrangement for this kind of control can be configured by concentrating the first and second control sections which are portions other than the current command value calculating circuit 20 for generating the AC current commands in hardware logic circuitry structured to include the comparator circuit 30 and the logic circuit 40 as described in the foregoing. For this reason, it is needed to configure only the current command value calculating circuit 20 with a CPU and there is no need for any expensive and intricate CPU. Furthermore, since the number of pieces of information to be taken into the CPU is small, it is possible to reduce the number of A/D converters, thus contributing to simplification of peripheral circuits. Consequently, it is possible to achieve reliable high-speed current control with the control device 12 which is less expensive and simply configured.

In addition, since the power converter is configured such that the main converter 3 is switched at a low frequency and the sub-converters 4 working at low voltage levels are switched at a high frequency to suppress the AC currents, the AC reactors 5 may be of a compact type, and because the semiconductor switching devices of the sub-converters 4 may be devices having a withstand voltage approximately one-fifth that of the devices used for the main converter 3, it is possible to configure the power converter with low-withstand-voltage devices having a small specific on-resistance.

Figure 12:
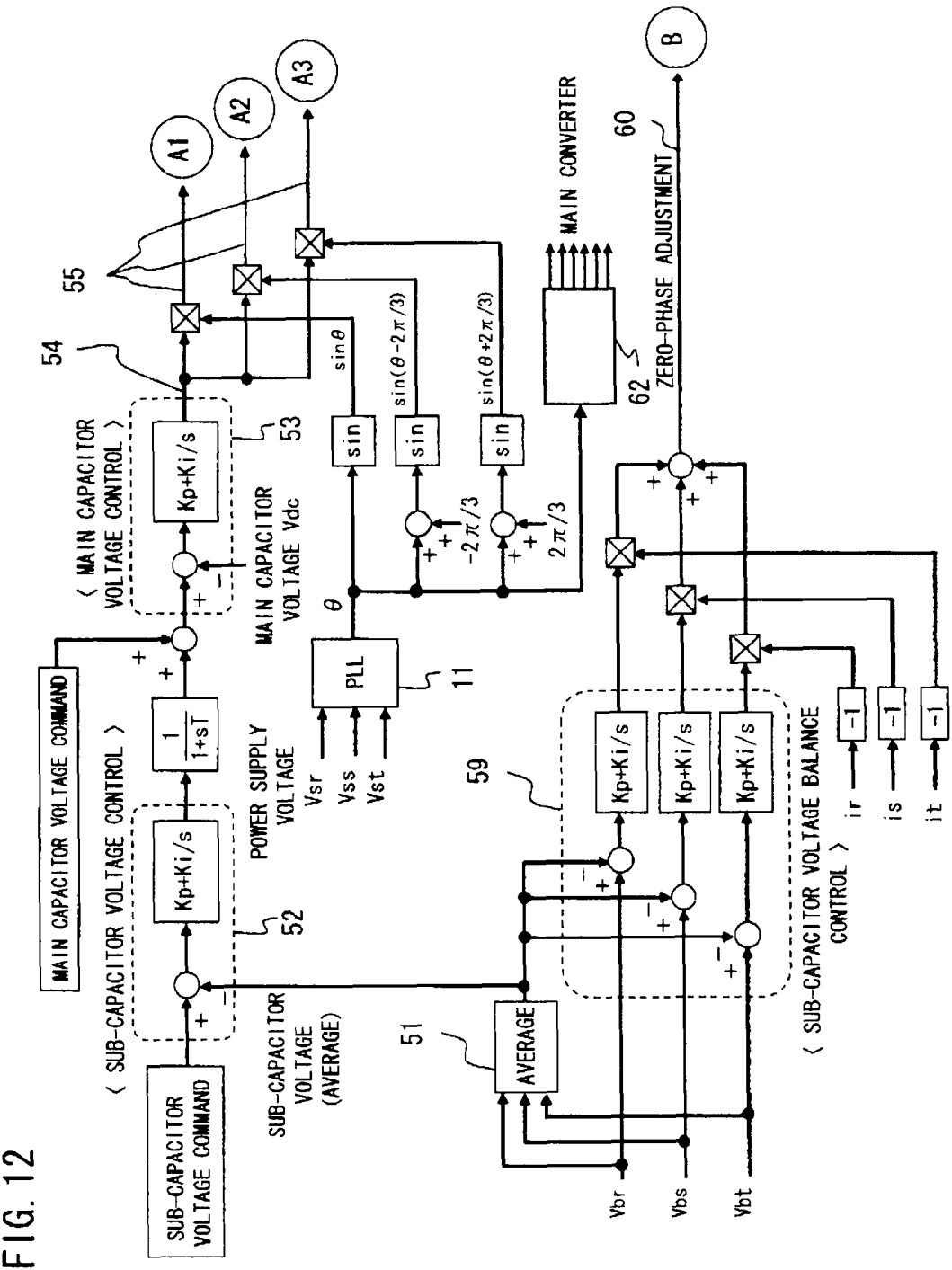
FIG. 12 is a diagram illustrating the configuration of a control device (CPU) according to a comparative example of the first embodiment of the present invention.
Figure 13:
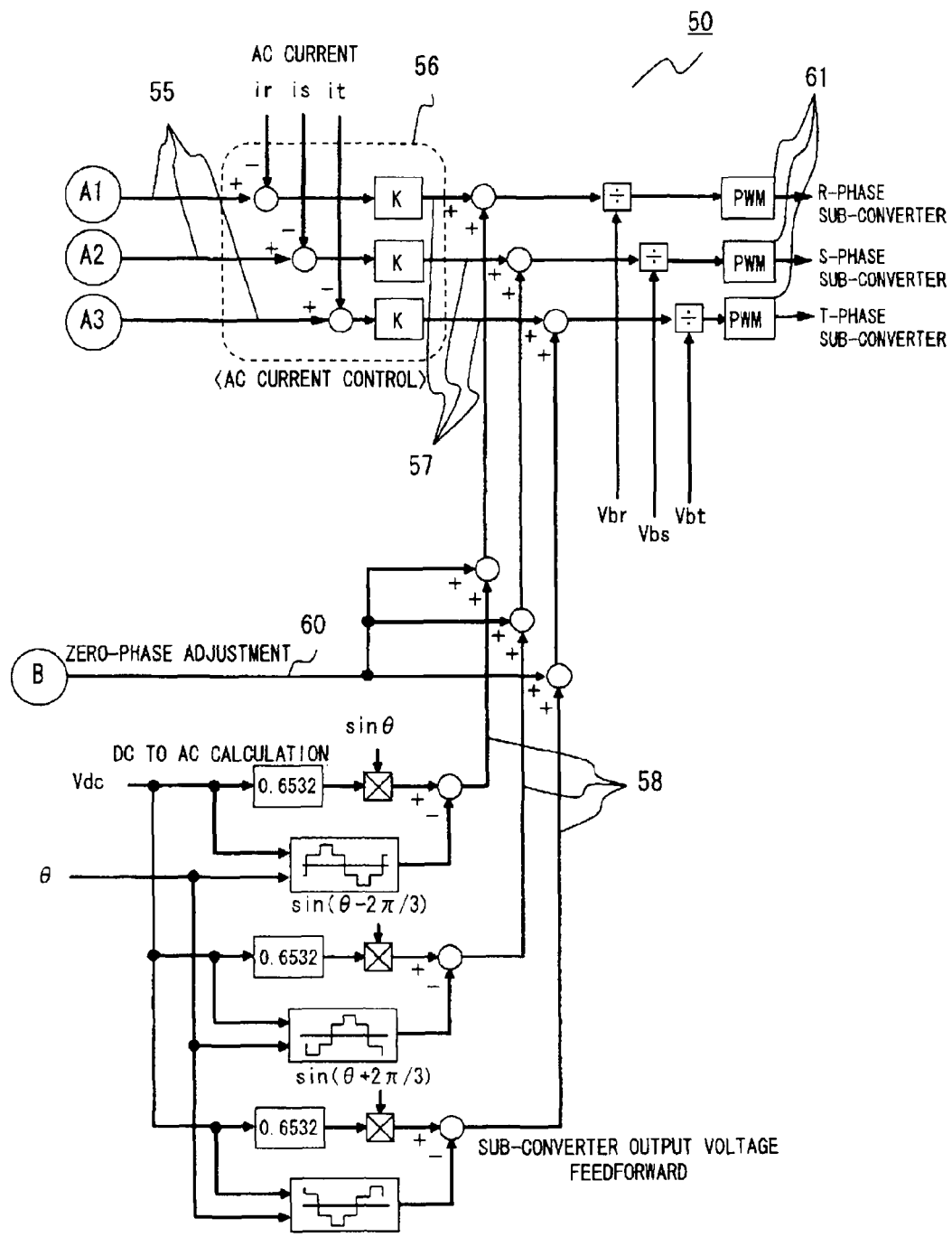
FIG. 13 is a diagram illustrating the configuration of the control device (CPU) according to the comparative example of the first embodiment of the present invention.

Illustrated next in FIGS. 12 and 13 is a comparative example of control hardware which is based on the assumption that the control device is configured with a CPU alone as an imaginative case.

A control device 50 illustrated in FIGS. 12 and 13 receives the voltages Vbr, Vbs, Vbt of the sub-capacitors 9 of the individual phases, the voltage Vdc of the main capacitor 7 and the AC currents "ir", "is", "it" flowing in the individual phases through A/D converters and further receives phase θ of the three-phase AC power supply 1 in the form of a digital signal derived from an output signal of the PLL circuit 11.

In control operation performed for the main converter 3, a one-pulse signal generating circuit 62 produces gate driving signals which are signals generated at a rate of one pulse per cycle of the power supply phase voltage based on the phase θ fed from the PLL circuit 11.

In control operation performed on the side of the sub-converters 4, a circuit 51 calculates an average sub-capacitor voltage which is an average value of the three phases using the voltages Vbr, Vbs, Vbt of the individual phases as inputs. Then, a main capacitor voltage command is adjusted by adding an output of a sub-capacitor voltage control circuit 52 controlled by a PI control action performed thereby so that the average sub-capacitor voltage follows a sub-capacitor voltage command, or so that the difference therebetween becomes zero. Further, a main capacitor voltage control circuit 53 calculates amplitude 54 of each AC current command by performing a PI control action so that the main capacitor voltage Vdc follows the AC current command upon completion of adjustment, or so that the difference therebetween becomes zero. Also, reference sine waves of the individual phases are calculated based on the phase θ input from the PLL circuit 11 and AC current commands 55 for the individual phases are calculated by multiplying the AC current command amplitude 54 by the reference sine waves of the individual phases.

Next, upon comparing the input AC currents "ir", "is", "it" flowing in the individual phases with the AC current commands 55 for the relevant phases, an AC current control circuit 56 performs feedback control so that the current deviation becomes zero. Also, besides this feedback control, output voltage commands 58 for the sub-converters 4 are estimated from the power supply phase θ and the main capacitor voltage Vdc by calculation are added as feedforward terms to respective current control outputs 57. Further, differences between the sub-capacitor voltages Vbr, Vbs, Vbt of the individual phases and the average value calculated by the circuit 51 are calculated, and a zero-phase voltage 60 calculated based on outputs controlled by a sub-capacitor voltage balance control circuit 59 so that the aforementioned differences are minimized is superimposed on the respective output voltage commands 58.

The output voltage commands 58 on which the zero-phase voltage 60 has been superimposed are added to the respective current control outputs 57 and these control terms are together normalized by the sub-capacitor voltages Vbr, Vbs, Vbt of the sub-converters 4 and PWM circuits 61 generate gate driving signals by sawtooth PWM control.

Since the main converter 3 is always controlled by the one-pulse signals in the control device 50 of this comparative example, only the sub-converters 4 perform current control. Thus, the power converting apparatus has a risk of going out of a controllable range under such abnormal conditions that the power supply voltage instantaneously drops, for example. Also, the sub-converters 4 are controlled by PWM by the output voltage commands generated such that the AC currents "ir", "is", "it" flowing in the individual phases follow the respective AC current commands 55. Since the control device 50 is configured with a CPU alone, the CPU should be of a type that is complex and expensive. Also, since response performance that allows the AC currents to follow the AC current commands 55 depends on the capability of the CPU, high-speed current control requires an even more expensive CPU. Additionally, since the AC currents "ir", "is", "it" flowing in the individual phases are also taken into the CPU, there is the need for a larger number of A/D converters.

In contrast, the earlier-described control device 12 according to the embodiment of this invention can be simply configured using an inexpensive CPU, yet achieving a high-speed control operation.

Second Embodiment

Next, a power converting apparatus according to a second embodiment of the present invention is described.

While the foregoing first embodiment has presented the converter which converts AC power into DC power, it is possible to use a power converter having a like configuration as an inverter which converts DC power into AC power.

Figure 14:
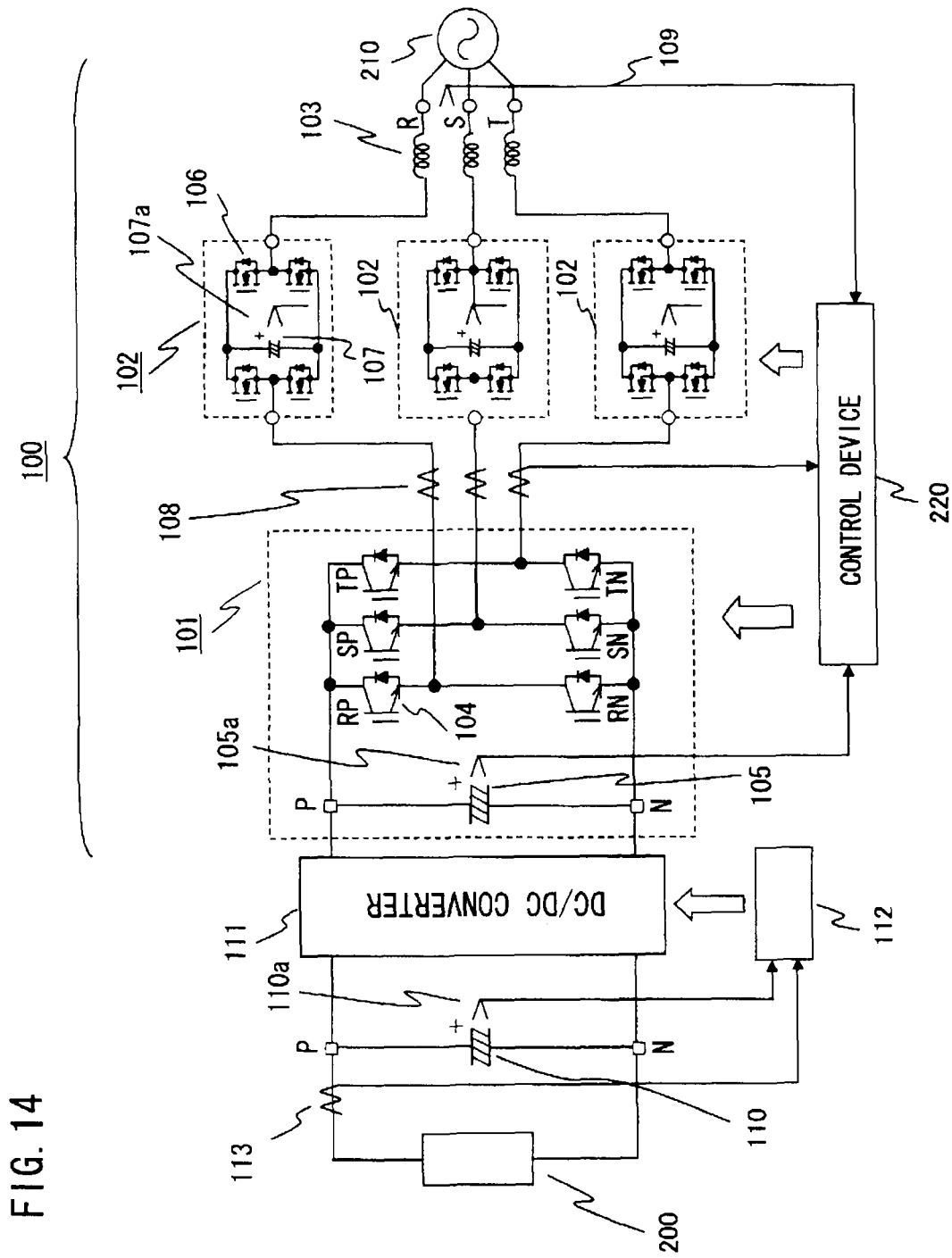
FIG. 14 is a configuration diagram of a power converting apparatus according to a second embodiment of the present invention.

FIG. 14 is a diagram illustrating the configuration of the power converting apparatus according to the second embodiment of the present invention. As illustrated in the Figure, the power converting apparatus converts DC power fed from a DC power supply 200 like a solar cell or a fuel cell into AC power and connects to an AC power supply 210 which is a three-phase power system. A main circuit includes a power converter 100 having a circuit configuration similar to the above-described first embodiment, a smoothing capacitor 110 and a DC/DC converter 111 provided in an upstream stage of the power converter 100 and is also provided with a control device 220 for performing output control of the power converter 100 and a controller 112 for controlling the DC/DC converter 111.

The power converter 100 is configured with a main inverter 101 made up of a three-phase two-level inverter for converting DC power fed from a smoothing capacitor 105 into AC power as well as sub-inverters 102 made up of single-phase full-bridge circuits and reactors 103 which are individually connected to AC lines of individual phases of the main inverter 101. The main inverter 101 employs self-turn-off type semiconductor switching devices 104 like IGBTs in which diodes are connected in reverse parallel, for example. Also, the sub-inverters 102 are each provided with a single-phase full-bridge circuit made up of a plurality of self-turn-off type semiconductor switching devices 106, such as a plurality of MOSFETs, and a sub-capacitor 107 which serves as an independently working power storage device. Here, designated by 105a is a voltage sensor for detecting a voltage Vdc across the smoothing capacitor 105 that serves as an input DC voltage of the main inverter 101, designated by 107a are voltage sensors for detecting voltages Vbr, Vbs, Vbt of the sub-capacitors 107 of the individual phases, designated by 108 are current sensors for detecting AC output currents "ir", "is", "it" flowing in the individual phases, designated by 109 are voltage sensors for detecting AC output voltages of the individual phases, designated by 110a is a voltage sensor for detecting a voltage across the smoothing capacitor 110 for smoothing an output DC voltage of the DC power supply 100, and designated by 113 is a current sensor for detecting an output current of the DC power supply 100.

The controller 112 controls the DC/DC converter 111 so that the DC power supply 100 outputs a specified voltage and power based on the output current and the output voltage of the DC power supply 100 obtained from the current sensor 113 and the voltage sensor 110*a*, respectively. In this case, the DC power supply 100 is configured with a solar cell and maximum power point tracking control is performed so that maximum power is output from the solar cell. The output voltages of the sub-inverters 102 of the individual phases are superimposed on the output voltages of the individual phases of the main inverter 101 and the AC voltages are output through the respective reactors 103. Since outputs are connected to the AC power supply 210, the output voltages are controlled to have voltages and phases equivalent to those of the AC power supply 210. Also, AC currents are controlled such that the power converting apparatus connects to the AC power supply 210 which is the power system at a power factor of 1 based on an amplitude calculated in a manner that maximum power is output from the DC power supply 100 with the aid of the DC/DC converter 111.

In a manner similar to the above-described first embodiment, the control device 220 has a current command calculator configured with a CPU for generating AC current commands in this case as well, the control device 220 including a first control section which generates first control signals for controlling the main inverter 101 based on phases of the AC power supply 210 and a second control section which generates second control signals for switching output voltage levels at an AC side of the sub-inverters 102 so that deviations of the instantaneous AC current values from the AC current commands would become smaller. Although a method used for generating the AC current commands differs in this case, control operation is otherwise the same as discussed in the foregoing first embodiment and the same advantageous effects as mentioned in the first embodiment are obtained.

The invention claimed is:

1. A power converting apparatus comprising:
    a power converter for performing power conversion between AC and DC including a main converter and sub-converters which deliver outputs to respective power storage devices provided individually at a DC side wherein a DC voltage of said main converter is higher than DC voltages of said sub-converters, said sub-converters being connected between said main converter and an AC power supply in series therewith; and
    a control device which controls said main converter by a first control signal generated based on a phase of said AC power supply, calculates an AC current command for an AC current input into said power converter and controls said sub-converters by a second control signal generated in such a fashion that the instantaneous value of the AC current follows the AC current command;
    said control device including:
    a current command calculator which adjusts a DC voltage command given to said main converter such that the DC voltages of said sub-converters follow a specific voltage command and generates the AC current command such that the DC voltage of said main converter follows the DC voltage command;
    a first control section which generates the first control signal to be delivered to said main converter; and
    a second control section which generates the second control signal for switching output voltage levels of said sub-converters at an AC side thereof such that a deviation of the instantaneous AC current value from the AC current command becomes smaller.

2. The power converting apparatus as recited in claim 1 wherein said power converter converts AC power fed from said AC power supply into DC power.

3. The power converting apparatus as recited in claim 1 wherein said first control section cuts off the first control signal supplied to said main converter to suppress the instantaneous AC current value when the deviation of the instantaneous AC current value from the AC current command exceeds a specified value.

4. The power converting apparatus as recited in claim 1 wherein said second control section is provided with a hysteresis comparator and performs follow-up control so that the instantaneous AC current value follows the AC current command.

5. The power converting apparatus as recited in claim 4 wherein said hysteresis comparator is configured to have a two-stage structure having different hysteresis widths.

6. The power converting apparatus as recited in claim 1 wherein said power converter is a three-phase power converter provided with said sub-converters for individual phases, and said second control section corrects the second control signal supplied to said individual sub-converters by generating a shift correction signal for shifting the AC-side output voltage levels of said sub-converters for the individual phases in the same up/down direction so that the DC voltages of said sub-converters for the individual phases are balanced.

7. The power converting apparatus as recited in claim 6 wherein said second control section limits the shift correction signal to a specific period to limit correction of the second control signal.

8. The power converting apparatus as recited in claim 1 wherein said control device is such that only said current command calculator is configured with a CPU whereas said first control section and said second control section are configured with hardware logic circuitry.

9. A power converting apparatus comprising:
    a power converter including a main inverter and sub-inverters wherein a DC voltage of said main inverter is higher than DC voltages of said sub-inverters, said sub-inverters being connected between said main inverter and an AC power supply in series therewith, and said power converter converts DC power fed from a DC power supply into AC power and supplies the AC power to the AC power supply; and
    a control device which controls said main inverter by a first control signal generated based on a phase of said AC power supply, calculates a command for an AC current output by said power converter and controls said sub-inverters by a second control signal generated in such a fashion that the instantaneous value of the AC current follows the AC current command;
    said control device including:
    a current command calculator which generates the AC current command such that the DC power fed from said DC power supply is maximized;
    a first control section which generates the first control signal to be delivered to said main inverter; and
    a second control section which generates the second control signal for switching output voltage levels of said sub-inverters at an AC side thereof such that a deviation of the instantaneous AC current value from the AC current command becomes smaller.

* * * * *